April 19, 1966     J. J. CUNHA     3,246,912
TRUCK AND TRAILER COMBINATION
Filed Dec. 31, 1963     2 Sheets-Sheet 1
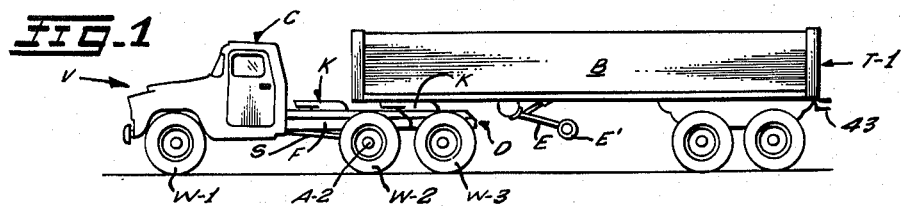
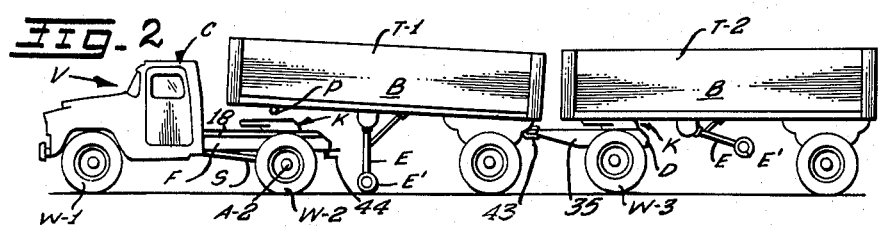
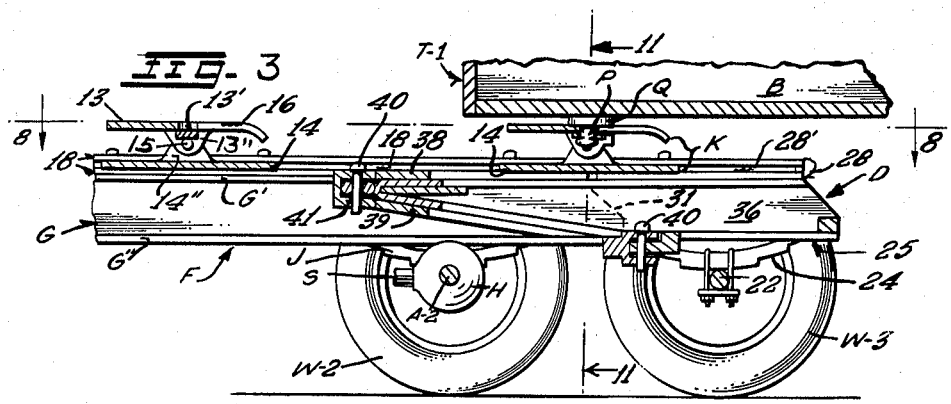
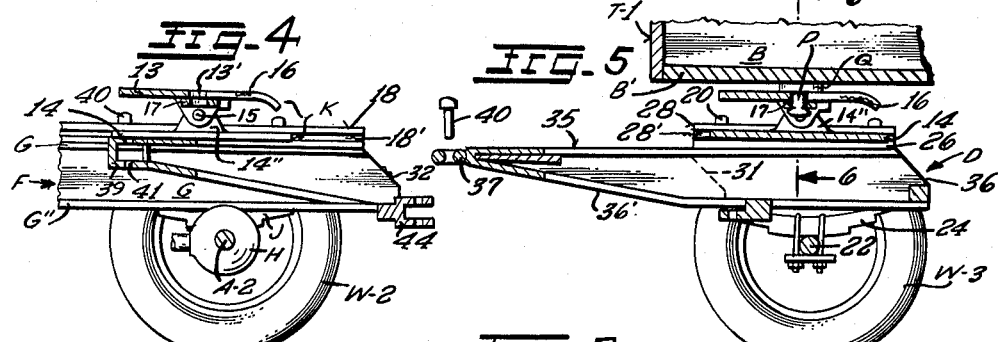
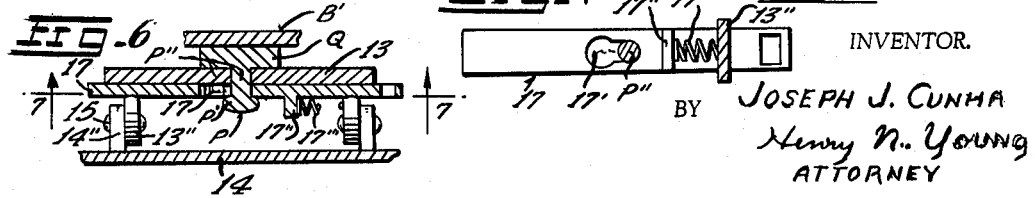
INVENTOR.
JOSEPH J. CUNHA
BY Henry N. Young
ATTORNEY April 19, 1966 J. J. CUNHA 3,246,912
TRUCK AND TRAILER COMBINATION
Filed Dec. 31, 1963 2 Sheets-Sheet 2
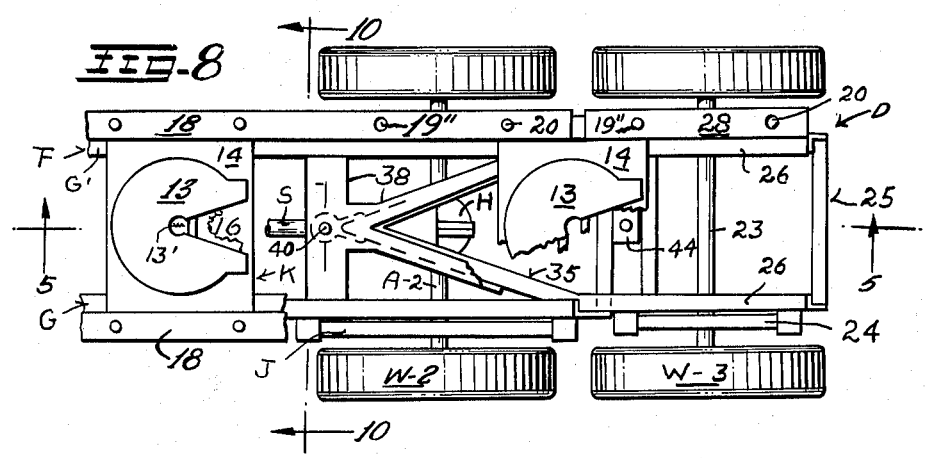
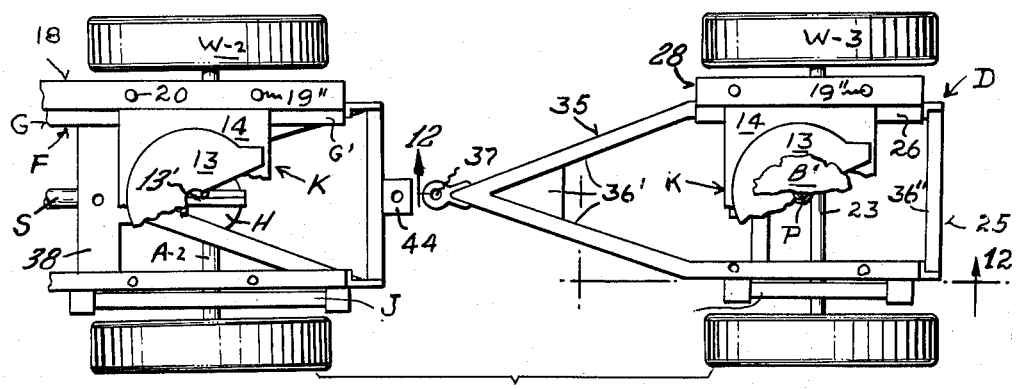
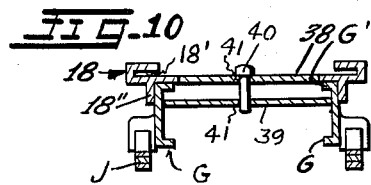
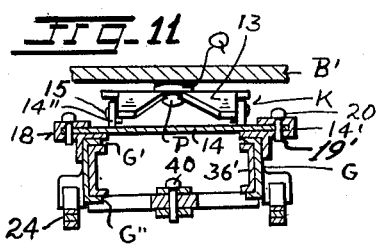
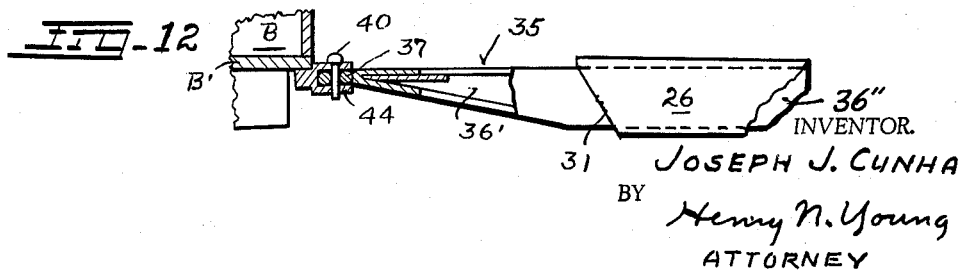
INVENTOR.
JOSEPH J. CUNHA
BY
Henry N. Young
ATTORNEY United States Patent Office 3,246,912
Patented Apr. 19, 1966

3,246,912
TRUCK AND TRAILER COMBINATION
Joseph J. Cunha, Hayward, Calif., assignor to Cunha Products Incorporated, Castro Valley, Calif., a corporation of California
Filed Dec. 31, 1963, Ser. No. 334,766
7 Claims. (Cl. 280—407)

The invention relates to the cooperative association of a vehicular trailer with a towing truck.

In view of a present practice of alternately utilizing self-propelled vehicles for directly carrying loads and/or towing semi-trailer vehicles, the present features have been particularly designed to provide improved connections between a semi-trailer and the rear load-carrying portions of the chassis of the towing vehicle by the use of a coupling unit comprising part of a hitch which provides a direct universal-joint connection between the towing and towed vehicles, with or without the use of a special dolly carrying the coupling unit as a support means for the forward end of the attached trailer.

Accordingly, a general object is to provide for use in various combinations with a provided attaching element of a vehicular semi-trailer to be connected to a towing vehicle, a cooperative coupling unit for releasably and universally engaging the hitch element of the trailer, a vehicular dolly for carrying the coupling unit in dismountable or adjustable relation thereto, and the provision on the chassis of the towing vehicle and the chassis of the dolly of opposed rail member pairs providing slideways for the mounting engagement of the coupling unit with either or both of them in variable combinations.

Another object is to provide particularly simple and effective connecting structures for cooperation between the hitch element of the semi-trailer and the chassis of a traction vehicle, without requiring major structural changes in the chassis of the towing vehicle.

A more specific object is to provide a coupling unit of the character described which is particularly adapted for cooperative engagement with a commonly used kingpin which depends fixedly from the forward end of a semi-trailer.

The invention possesses other objects and features of advantage, some of which, with the foregoing, will be set forth or be apparent in the following description of typical embodiments and combinations thereof, and in the accompanying drawings, in which, FIGURE 1 is a schematic side elevation of a vehicle-and-trailer assembly in which the chassis of a self-propelled towing vehicle pivotally supports the front end of a semi-trailer while towingly attached to a two-wheel unpowered dolly unit having a chassis which is functioning through a coupling unit to simultaneously provide portions of the support for the rear end of the vehicle and for the forward end of the attached semi-trailer.

FIGURE 2 is a side elevation of an arrangement in which the dolly unit of FIGURE 1 has been applied for the front support of a rear trailer of a trailer pair connected in tandem and adapted for its towing by the towing vehicle, with the forward end of the leading trailer having the connecting kingpin beneath it raised clear of a coupling unit carried by said vehicle.

FIGURE 3 is an enlarged fragmentary longitudinal sectional elevation of the connection of the vehicles of FIGURE 1.

FIGURE 4 is a longitudinal upright central section of the rear chassis portion of the towing vehicle shown in FIGURE 1.

FIGURE 5 is a fragmentary upright section of the disconnected dolly as supporting the forward end portion of the semi-trailer of FIGURE 1.

FIGURE 6 is an enlarged fragmentary section taken generally at the line 6—6 in FIGURE 5.

FIGURE 7 is an underneath view taken from the line 7—7 in FIGURE 6 and showing a kingpin locking means of the coupling unit.

FIGURE 8 is a fragmentary plan view taken below the line 8—8 in FIGURE 3.

FIGURE 9 is a plan view taken below the line 8—8 in FIGURE 3 and showing the operative dolly unit longitudinally freed of the truck chassis.

FIGURE 10 is a fragmentary upright section taken at the line 10—10 in FIGURE 8.

FIGURE 11 is a fragmenteary upright view and stepped section taken to the line 11—11 in FIGURE 3.

FIGURE 12 is a fragmentary and partly sectional longitudinal view taken from the stepped line 12—12 in FIGURE 9 and showing a possible connection of the dolly tongue with the rear end of the forward semi-trailer of FIGURE 2.

As is generally illustrated, the present device is associatable with the chassis of a self-propelled draft vehicle V which is supported at its front in a usual manner by a pair of dirigible wheels W1 and is supported at its rear on a pair of coaxial rear support and drive wheels W2 which are suitably arranged for their driving from a truck-mounted engine (not shown) through a usual drive shaft S which extends to a usual differential drive connection between aligned wheel-mounted axles A2 extending to the wheels W2 through a rigid differential-and-axle housing H which supports the rearward portion of the vehicle chassis frame F therefrom on semi-elliptic springs J operatively interposed between the axle housing H and the wheel-carried axles A2. As illustrated, the rearward chassis portion extends beyond a chassis-carried operator's cab C, and comprises fixedly connected spaced and opposed channel-beam frame elements G having corresponding longitudinal upper and lower mutually coplanar web-connected flanges G' and G" thereof on the flanges G' of which trailer-attaching guide-rail elements of the present combination are directly and fixedly mountable.

A usual coupling kingpin P depends rigidly from a turntable plate Q fixed to and beneath a forward end point of and beneath the body B of a semitrailer T1 for attaching the same directly to a towing vehicle or of a semitrailer T2 for attachment behind the trailer T1, and comprises part of a suitable universal joint or hitch connection with the towing vehicle. A suitable means is preferably provided for independently and directly supporting the forward end portion of the body B (flat-bed or box) of an unattached trailer from a supporting surface for the towing vehicle and trailers. As indicated, a suitable strut arm E is hingedly related to the bottom of the body B at a forward bottom point thereon which is rearwardly of the kingpin P and carries one or more support rollers E' at its lower end. The arm E is lowerable, as indicated in FIGURE 2, to then support the trailer body B thereat on the wheels E' and in a generally horizontal position for positioning the trailer body against a gravity shifting of its load while facilitating a connecting engagement of the trailer-provided kingpin P with a towing vehicle, after which the arm E is swung upwardly and suitably held in an inoperative position beneath the trailer bottom B', as in FIGURE 1.

It will now be noted that the depending trailer-carried coupling kingpin P has an annular head P' at its lower end and has its shank P" releasably engageable with a particularly simple and effective coupling unit K journaling the kingpin in a generally discate plate member 13 which is rockably mounted on a rectangular base plate element 14 arranged for the slidably adjusted engagement of opposite and coplanar edge portions 14' thereof in and along opposed and coplanar slideways provided by guide rails carried by a mounting vehicle. The member 13 is provided therethrough with an interior bearing opening 13′ in which the kingpin P is releasably journable, and said member is rockably attached to the plate element 14 by a hinge pin 15 extending through parallel ears 13″ depending fixedly from the member 13 at opposite sides of its opening 13′ and also through transversely spaced parallel ears 14″ extending upwardly and fixedly from the plate 14 between and adjacent the ears 13″, whereby to provide for a limited rocking of the member 13 about an axis which is parallel to the plane of the slideway-engaging edges of the plate element 14 and perpendicularly intersects the axis of the inserted kingpin.

For facilitating the engagement of the kingpin P in the generally central opening 13′ thereof, and as brought out in FIGURES 3 and 7 to 9, the member 13 is preferably, provided therethrough with a sector-shaped radial slot 16 extending to its peripheral edge from the upright bearing opening 13′ and in a fixed rearward direction therefrom which is parallel to the side plate edges. The tapered slot 16 has such a width at its inner end at the opening 13′ that it may closely pass the kingpin shank portion P″ of a trailer-carried kingpin P therealong and therethrough, and the directed movement of the kingpin shank into the opening 13′ is further facilitated by providing the member 13 adjacent the slot with sloping top face portions directed obliquely toward the plate 14. A suitable means is provided for releasably retaining the kingpin P in the opening 13′, and said means may, for instance, comprise a spring-biased bolt member 17 slidably mounted below the member 13 in guide slots provided through the ears 13″ of the member 13 and normally operative across the slot 16 at its inner end to then prevent the escape of the kingpin shank P″ from the opening while laterally transmitting a towing force between connected vehicles.

As is brought out in FIGURES 8 and 9, the bolt member 17 comprises an elongated flat and uniformly wide bar element which is sufficiently rigid in its plane and intermediately provided with a longitudinal transverse "keyhole" opening 17′ for freely receiving a kingpin head P′ through its larger portion and only the kingpin shank P″ through its smaller portion, with the bolt longitudinally adjustable between one limiting position in which the larger portion of the opening 17′ may freely receive the kingpin head P′ therethrough while registered with the opening 13′ and a position in which, as illustrated, the engagement of the kingpin shank in the smaller portion of the opening 17′ prevents a movement of the kingpin head through the opening 13′. As shown, the bolt element 17 has a rigidly depending lug 17″ thereof arranged for the installation of a compression spring 17‴ between it and the ear 13″ adjacent the smaller end of the opening 17′ for biasing the bolt 17 to normally retain the engaged kingpin in swiveled relation in the opening 13′ against a shifting of the bolt to provide for a limited pull-out movement of the bolt 17 to release a retainedly engaged kingpin P with respect to the member 13 of the coupling unit K.

Referring now to the adjustably fixed engagement of a plate 14 with the truck chassis, it will be noted that the upper flanges G′ of the chassis frame beams G mount rails 18 which include mutually opposed channel portions providing slideways 18′ of uniform like cross-section therealong for complementarily and slidably receiving the side edge portions 14′ of a plate 14 and are defined between upper and lower flange portions of the rails. As shown in FIGURES 10 and 11, flange-like ribs 18″ depend integrally from intermediate portions of the lower rail flanges and are fixedly attached to the upper portions of the elements G below and between them, as by welding, in the corners defined between the lower rail flanges and the ribs 18″. For releasably fixing a received plate 14 in adjusted position in rail slideways 18′, the received edge portions 14′ of a plate 14 are provided with transverse holes 19′ for registration with aligned holes 19″ provided in the rail flanges for the removable reception of upright holding pins 20 in registered holes 19′ and 19″. Also, and as shown, the plate-receiving and guideway rails 18 preferably comprise one-piece structures of like uniform cross-section.

It will now be noted that the present truck and trailer combination includes at least one wheel-supported dolly unit D lacking a drive means for its support wheels W3, but otherwise including the general structural characteristics and relation of a vehicle chassis F with respect to its supporting rear wheels. Thus, the wheels W3 of a dolly D support an axle 22 in a mounting housing 23 which in turn directly supports, through semi-elliptic springs 24, a chassis frame 25 including straight and mutually opposed chassis side frame elements 26 comprising channel beams fixedly mounting attached rail elements 28, corresponding to the rails 18 on the vehicle chassis F, on and along the tops thereof and providing mutually opposed slideways 28′ which are arranged to slidably receive, in adjustably set relation thereto by the use of appropriately disposed holding pins 20, the base plate 14 of a coupling unit K. For a reason to be hereinafter brought out, the straight top side elements 26 of a dolly D have their forward ends complementary to the rear ends of the vehicle chassis side beams G for optional fitting abutment therewith, as well as in the assemblies of FIGURES 1 and 3.

As particularly shown for a dolly unit D, the edge portions 14′ of a base plate 14 of a coupling unit K are complementarily slidable in the slideways 28′ of the dolly-carried rails 28 which are defined between upper and lower rail flanges which are connected by depending rib portions 28″ to the chassis side beams 26 in the same secured relation thereto as are the ribs 18″ of the rails 18 to the beams G of the chassis frame F, and the slide plates 14 have a like width for their optional mounting in the slideways 18′ of the rails 18 or in the slideways 28′ of the rails 28 to provide a means for coupling a trailer-provided kingpin P to a vehicle chassis F or to a dolly chassis 25. To provide for a mounting of a slide plate 14 of a coupling assembly K in a slideway 18′ or 28′, said slideways, as illustrated, are mutually alignable in coplanar relation when disposed at the same height above a common surface supporting the vehicle wheels W2 and the dolly wheels W3. Also, as shown in FIGURES 1 and 3, the straight dolly side frame elements 26 have their forward ends complementary to the rear ends of the vehicle side beams G for a more-or-less fitting abutment therewith.

Preferably, and as shown, the mutually abuttable forward ends 31 of the beams 26 of the dolly chassis 25 and the rear ends 32 of the vehicle chassis beams G complementarily slope downwardly and rearwardly from the top flanges of the respective beams whereby the ends 31 of the beams 26 may supportedly rest upon the ends 32 of the beams G while said ends are maintained in generally abutted relation, as by a tongue unit 35 of a dolly chassis 25. In the present dolly assembly, a tongue 35 comprises channel-section side elements 36 which have forward portions 36′ tapering symmetrically forwardly from mutually parallel rear portions 36″ which are suitably secured to and within the mutually opposed channels of the dolly side beams 26. The lower flange edges of the forward tongue portions 36′ slope upwardly from the forward ends of the portions 36″ toward the top flange thereof and to a common terminal attaching eye 37 having its bore perpendicular to said top plane of the portions 36″ in a line bisecting the angle of the tongue. As is shown in FIGURE 8, the side elements 36 of the tongue unit 35 are of tapered channel section with their open sides mutually opposed, have their upper flanges mutually coplanar for their entire lengths rearwardly of the eye 37, and have their extending lower flange portions sloping forwardly and upwardly to the plane of the under side of the eye 37 to facilitate the attachment of the tongue eye 37 to a draft vehicle.

As disclosed in FIGURES 3 and 4 and 5 and 10, a flat chassis-frame cross-member 38 connects the upper flanges G' of the longitudinal vehicle-chassis beams G, and a fixedly installed spacing plate 39 connects the webs of the vehicle chassis beams G in such parallel spaced relation below the plate 38 that the terminal tongue eye 37 is fittedly insertable between the plates 38 and 39 for removably receiving an upright coupling pin 40 through registering transverse holes 41 in said plates while the opposed ends 32 and 31 of the chassis elements G and 26 are in more-or-less abutting relation for connecting a dolly D to a vehicle V, as in FIGURES 1 and 3 and 5. It will be understood, however, that the connection provided by the pin 40 might be replaced by a suitable coupling of a type which is under remote control, as by a hydraulic or pneumatic means.

By general reference to the guideway-providing rails 18 might also re-mount a load-carrying body (not shown) usual vehicle chassis beams and provide the opposed slideways 18' for guidedly receiving the base plate 14 of a kingpin coupling unit K(13-14), it will be understood that these elements, and possibly the cross-member 38 and plate 39 providing a dolly tongue connection for a usual towing vehicle chassis, would usually comprise the only required additions to adapt such a truck chassis structure for the disclosed use of a present dolly unit D therewith and might be detachably, rather than permanently, secured in operative position on a mounting chassis, and so not comprise a necessary part of the original chassis. Correspondingly, the guideway-providing rails 28 might be directly or detachably mounted on the side beams 26 of the chassis 25 of the dolly unit D, with the base plate 14 of the coupling unit K then directly and replaceably attached to the dolly chassis elements 26 in case a guided sliding adjustment of the plate 14 on the dolly chassis is not to be utilized.

Referring now to the truck and trailer assembly (V–T–1) of FIGURES 1 and 3 and 5, it will be noted that a kingpin coupling unit K(13-14) provided on and with the vehicle chassis F may be moved forwardly along the mounting rails 18 toward the vehicle cab C in a non-use position or be rearwardly dismounted from the rails 18, whereby a dolly-carried unit K may be utilized to add to the support of the forward end of a semi-trailer T1 provided by the rear vehicle wheels W2 by disposing it forwardly from its fully mounted position on the dolly chassis 25 and in the slideways 18' of the rails 18 in a retained relation by the application of pins 20 in registered holes 19' and 19" in the flanges of the rails 18 of the vehicle V and the rails 28 of the dolly D for disposing the axis of the opening 13' of the plate 13 substantially midway between the lines of support provided by the vehicle wheels W2 and the dolly wheels W3. The load provided by the forward end of a supported semi-trailer T1 may thus be evenly distributed between the rear vehicle wheels W2 and the dolly wheels W3, as is desirable, while the secured plate 14 of the unit K comprises an aligning connection between the connected rails 18 and 28.

By particular reference to FIGURES 2 and 12, an arrangement is shown in which a dolly assembly D carrying a coupling unit K supports the forward end of the second trailer T2 which is hingedly attached to the rear end of the leading trailer T1 by the eye 37 of a dolly tongue 35 by utilizing a connecting pin 40, or another, engaged in the tongue eye 37 and a clevis-like rear connection 43 of the trailer T1. In the present indicated assembly, the towing vehicle V is arranged to support the forward end of the trailer T1 by the connection of its kingpin P with a chassis-mounted coupling unit K, whereby the present assembly utilizes one unit K carried by the vehicle V to support a first trailer T1 and a second unit K carried by a dolly unit D at its front and is towably connected to the rear end of the trailer T1 at a coupling K to provide a continuous swivel connection with the kingpin P of the second semi-trailer T2 whereby to complete an articulated vehicular train assembly comprising, in order, the towing vehicle V and the semi-trailers T1 and T2.

With particular reference to the indicated arrangement of FIGURE 2, it will be noted that if the strut arm E is lowered to support the forward end of the trailer T2 and the dolly-carried coupling unit is disconnected from the kingpin of the trailer T2, the dolly unit may remain attached at the clevis-type connection 43 to the leading trailer T1 (FIGURE 12) for traveling therewith. If, however, the support strut E is subsequently lowered from the semi-trailer T1 to support the front end portion of the same, the subsequent release of the kingpin P of the leading trailer T1 from the vehicle-carried unit K permits a movement of the vehicle V from beneath the forward end of the static trailer T1, to permit an attachment of the freed dolly unit D to a rear clevis-type eye 44 of the vehicle chassis (FIGURES 4 and 11), or the optional hitching of the dolly eye 37 with the vehicle chassis at a rear clevis-type connection 44 for a towing of the dolly behind the vehicle or a chassis-supporting engagement of the dolly with the vehicle (FIGURE 5). In view of the foregoing, it will be understood that the releasable relation of the connection K with respect to a towing kingpin P of a semi-trailer, combined with the adjustable mounting of the connection K on a supporting dolly and/or vehicle chassis, provide for variable utility combinations with respect to semi-trailer vehicles connected to towing vehicles.

In generally considering the full cooperative assemblies of FIGURES 3 and 5, it will be noted that this combination includes a coupling unit K which is cooperatively carried on and between the chassis F of the towing vehicle V and the chassis 25 of the dolly unit D for a joint support of the forward end of a trailer T1 on and between the guide rails 18 of the chassis F and the aligned rails 28 of the chassis 25 which may cooperatively or selectively engage the plate 14 on the unit K.

With reference to the full combination of FIGURES 1 and 3, it will be understood that the channels G of a usual truck chassis F might have originally mounted a load-carrying body (not shown) upon their body-supporting flanges G' and that the upper flanges of the attached rails 18 might also re-mount a load-carrying body (not shown) for its independent use if the bed of such a truck body is appropriately notched out from its rear end to permit either disclosed attachment of a coupling unit K. It will also be noted that the rails 18 on the truck chassis which provide the slideways 18' may be suitably applied, as by clamps or connecting bolts, to the side beams G of a usual truck chassis.

While I have heretofore particularly shown and described the features of my invention as applied to a wheeled truck-and-trailer combination, it will be understood that many features thereof are providable for connecting other types of towing and trailing vehicles which are otherwise supported. Thus, reference is made, for instance, to the application of present connections to trailers for aircraft, in trains of railway vehicles, to gliding trailers for ice-borne towing vehicles, and to trailers for water-borne vehicles.

From the foregoing description taken in connection with the accompanying drawings, the advantages of the present truck and trailer combination will be readily understood by those skilled in the art to which the invention appertains. While I have shown and described structures and arrangements thereof which I now consider to comprise preferred embodiments of my invention, I desire to have it understood that the disclosures are primarily illustrative, and that such changes and developments may be made, when desired, as fall within the scope of the following claims:

1. In combination with a wheel supported draft vehicle having a load supporting chassis extending rearwardly therefrom and a vehicular semi-trailer having a first draft connection at the forward end thereof and support wheels at the rearward end thereof, an improved load distributing assembly for coupling said first draft connection to the load supporting chassis of said draft vehicle, comprising:
   (a) a wheel supported dolly having a chassis substantially coplanar with said load supporting chassis;
   (b) first and second mating connecting means on said respective chassis to rigidly interconnect said chassis in substantially coplanar relationship with said dolly in trailing relationship to said draft vehicle;
   (c) draft connection supporting means adapted to assume a position fixed to and extending longitudinally between said respective chassis when interconnected;
   (d) a second draft connection received on said draft connection supporting means for longitudinal movement therealong between said respective chassis when interconnected, said second draft connection being adapted to be coupled in engagement with said first draft connection to support the forward end of said trailer for universal pivotal movement; and
   (e) means to fixedly secure said second draft connection at preselected positions along said draft connection supporting means.

2. An improved load distributing assembly according to claim 1, wherein:
   (a) said first connecting means comprises a female wedge on one of said chassis having a locking element operatively associated therewith; and,
   (b) said second connecting means comprises a male wedge on the other of said chassis adapted to snugly mate within said female wedge, said male wedge having a locking element operatively associated therewith and adapted to engage the locking element associated with said female wedge to lock said wedges in mating relationship.

3. An improved load distributing assembly according to claim 2, wherein:
   (a) said female wedge comprises a tapered cavity extending longitudinally of said supporting chassis and defined by a pair of walls fixed to said chassis and diverging with respect to each other transversely of said chassis from a position forwardly thereon to an open end at the rear thereof; and,
   (b) said male wedge comprises a tapered probe extending longitudinally of the chassis of said dolly and defined by a pair of walls fixed at the rearward ends thereof to said chassis and extending forwardly therefrom in converging relationship to each other transversely of said chassis.

4. An improved load distributing assembly according to claim 1, wherein:
   (a) the draft connection supporting means comprises at least one rectilinear track; and,
   (b) the second draft connection is slidably received on said track.

5. In combination with a wheel supported draft vehicle and a vehicular semi-trailer having a first draft connection at the forward end thereof and support wheels at the rearward end thereof, an improved load distributing assembly for coupling said first draft connection to said draft vehicle, comprising:
   (a) a wheel supported dolly;
   (b) first and second mating connecting means on said draft vehicle and dolly, respectively, to rigidly interconnect said dolly in trailing relationship to said draft vehicle;
   (c) draft connection supporting means adapted to assume a position fixed to and extending longitudinally between said draft vehicle and dolly when interconnected;
   (d) a second draft connection received on said draft connection supporting means for longitudinal movement therealong between said draft vehicle and dolly when interconnected, said second draft connection being adapted to be coupled in engagement with said first draft connection to support the forward end of said trailer for pivotal movement about a vertical axis; and,
   (e) means to fixedly secure said second draft connection at preselected positions along said draft connection supporting means.

6. In combination with a wheel supported draft vehicle having a load supporting chassis extending rearwardly therefrom and a vehicular semi-trailer having a first draft connection at the forward end thereof and support wheels at the rearward end thereof, an improved load distributing assembly for coupling said first draft connection to the load supporting chassis of said draft vehicle, comprising:
   (a) a wheel supported dolly having a chassis substantially coplanar with said load supporting chassis;
   (b) first and second mating connecting means on said respective chassis to interconnect said chassis in substantially coplanar relationship with said dolly in trailing relationship to said draft vehicle;
   (c) draft connection supporting means adapted to assume a position secured to and extending longitudinally between said respective chassis when interconnected;
   (d) a second draft connection received on said draft connection supporting means for longitudinal movement therealong between said respective chassis when interconnected, said second draft connection being adapted to be coupled in engagement with said first draft connection to support the forward end of said trailer for universal pivotal movement; and
   (e) means to fixedly secure said second draft connection at preselected positions along said draft connection supporting means.

7. In combination with a wheel supported draft vehicle and a vehicular semi-trailer having a draft connection at the forward end thereof and support wheels at the rearward end thereof, an improved load distributing assembly for coupling said first draft connection to said draft vehicle comprising:
   (a) a wheel supported dolly;
   (b) first and second mating connecting means on said draft vehicle and dolly, respectively, to rigidly interconnect said dolly in trailing relationship to said draft vehicle; and,
   (c) a second draft connection adapted to be fixedly supported on and between said draft vehicle and dolly when interconnected, said second draft connection being adapted to be coupled in engagement with said first draft connection to support the forward end of said trailer for pivotal movement about a vertical axis.

References Cited by the Examiner

UNITED STATES PATENTS

| | | | |
|---|---|---|---|
| 1,892,004 | 12/1932 | Reid | 280—418 |
| 2,589,842 | 3/1952 | Mittell | 280—418 X |
| 2,713,500 | 7/1955 | Flynn | 280—423 X |
| 2,776,846 | 1/1957 | Willock | 280—407 |
| 2,852,273 | 9/1958 | Hudson | 280—420 |
| 2,982,563 | 5/1961 | Gregg | 280—81 |
| 3,163,306 | 12/1964 | Bennett et al. | 214—515 |

LEO FRIAGLIA, *Primary Examiner.*